United States Patent
Anubolu et al.

(10) Patent No.: US 11,909,670 B2
(45) Date of Patent: *Feb. 20, 2024

(54) POWER THROTTLE FOR NETWORK SWITCHES

(71) Applicant: Avago Technologies International Sales Pte. Limited, Singapore (SG)

(72) Inventors: Surendra Anubolu, Fremont, CA (US); Sachin Prabhakarrao Kadu, Fremont, CA (US); Laxminarasimha Rao Kesiraju, Cupertino, CA (US); Mohan V. Kalkunte, Saratoga, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,854

(22) Filed: Jun. 21, 2022

(65) Prior Publication Data

US 2022/0321504 A1 Oct. 6, 2022

Related U.S. Application Data (63) Continuation of application No. 16/945,562, filed on Jul. 31, 2020, now Pat. No. 11,368,412.

(51) Int. Cl.
*H04L 49/505* (2022.01)
*H04L 49/90* (2022.01)

(52) U.S. Cl.
CPC ........ *H04L 49/505* (2013.01); *H04L 49/9084* (2013.01)

(58) Field of Classification Search
None
See application file for complete search history.

(56) References Cited

U.S. PATENT DOCUMENTS 11,368,412 B2 * 6/2022 Anubolu ............ G06F 1/3237
2011/0296222 A1 12/2011 Tan
(Continued)

FOREIGN PATENT DOCUMENTS

| CN | 107171441 A | 9/2017 |
| CN | 108630272 A | 10/2018 |
| CN | 106502359 A | 3/2023 |

OTHER PUBLICATIONS

Office Action Formal Report—CN 202110747970.8 dated Jul. 3, 2023.

*Primary Examiner* — Kenny S Lin
(74) *Attorney, Agent, or Firm* — Foley & Lardner LLP (57) ABSTRACT

The disclosed systems and methods provide methods and systems for providing power throttling adapted for high performance network switches. A method includes determining, for each of a plurality of measurement periods within a thermal average period, an energy usage estimate for a packet processing block configured to process ingress packets at a power gated clock rate. The method includes determining, for each of the plurality of measurement periods, a target clock rate for the packet processing block based on the determined energy usage estimates to meet a target energy value that is averaged for the thermal average period. The method includes adjusting, for each of the plurality of measurement periods, the power gated clock rate towards the target clock rate, wherein the adjusting causes the packet processing block to process the ingress packets at the adjusted power gated clock rate.

20 Claims, 8 Drawing Sheets

(56) References Cited

U.S. PATENT DOCUMENTS

2012/0066439 A1\* 3/2012 Fillingim ............. G06F 3/0653
 711/E12.008
2012/0146708 A1 6/2012 Naffziger
2014/0307746 A1 10/2014 Sasak et al.

\* cited by examiner

Zero Budget Policy with Constant High Load

FIG. 3A

Zero Budget Policy with Variable Load

FIG. 3B

Aggressive Ramp Policy with Constant High Load

FIG. 3C

Aggressive Ramp Policy with Variable Load

POWER THROTTLE FOR NETWORK SWITCHES

CROSS-REFERENCE TO RELATED APPLICATIONS

This application is a continuation of U.S. patent application Ser. No. 13/336,208, entitled "Power Throttle for Network Switches," filed on Jul. 31, 2020, which is expressly incorporated by reference herein.

TECHNICAL FIELD

The present disclosure generally relates to packet processing, and more specifically relates to methods and systems for providing power throttling adapted for high performance network switches.

BACKGROUND

High performance computing and other demanding scale out applications in the datacenter continue to require higher port counts, larger bandwidth, and reduced latency in packet processing devices such as network switches and routers. Power consumption improvements from process node geometry reductions are fast approaching hard physical limitations. Thus, sole reliance on process node improvements may be insufficient to keep up with increasing performance demands for packet processing devices.

DESCRIPTION OF THE FIGURES

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of this disclosure, the scope of which is set forth in the claims that follow.

DESCRIPTION

While aspects of the subject technology are described herein with reference to illustrative examples for particular applications, it should be understood that the subject technology is not limited to those particular applications. Those skilled in the art with access to the teachings provided herein will recognize additional modifications, applications, and aspects within the scope thereof and additional fields in which the subject technology would be of significant utility.

To meet the increasing performance demands of modern datacenter and high performance computing applications, device architectural improvements are needed to maintain performance momentum in view of slowing process node improvements. In particular, packet processing devices such as switches may require improved power management to meet performance requirements within a target thermal design power (TDP), which may be bounded according to device form factor and available cooling capacity. Existing power management approaches may perform a fixed down-clocking such as a decoupled packet rate, which may negatively affect device performance. Further, these approaches may require devices to be designed with lower TDP bounds to accommodate a sustained peak packet rate that corresponds to approximately double the anticipated average packet rate, resulting in overdesigning of devices and inefficient use of device capacity.

Systems and methods are provided for power throttle for network switches, wherein the throttling is managed over thermal time periods based on meeting, for each thermal time period, a target energy consumption by periodically measuring estimated power consumption and adjusting throttle targets accordingly. Clock gating may be utilized to modularly reduce power consumption while avoiding the performance penalty of down clocking, thereby maintaining packet processing performance and enabling devices to be designed with TDP bounds more closely aligned to anticipated workloads. Further, by using a relatively long thermal time period, such as from hundreds of milliseconds to several seconds, burst traffic can be absorbed for longer time periods before throttling occurs. Various policies for conservative or aggressive ramping of clock gating may be chosen based on use case requirements and application preferences. The automatic throttle control may also be bypassed by manually overriding the throttle targets.

Power throttle for network switches may be especially relevant for high performance computing (HPC) applications, which may generate regular spikes of high burst network traffic, such as large numbers of small sized control packets. As discussed above, the use of relatively long thermal time periods for throttle control allows burst traffic to be absorbed for a longer period of time before throttling or ramping down of clock gating rate is required. By tuning the thermal time period and throttling policies, optimized power management may be provided for packet switching devices while minimizing performance penalties.

Figure 1A:
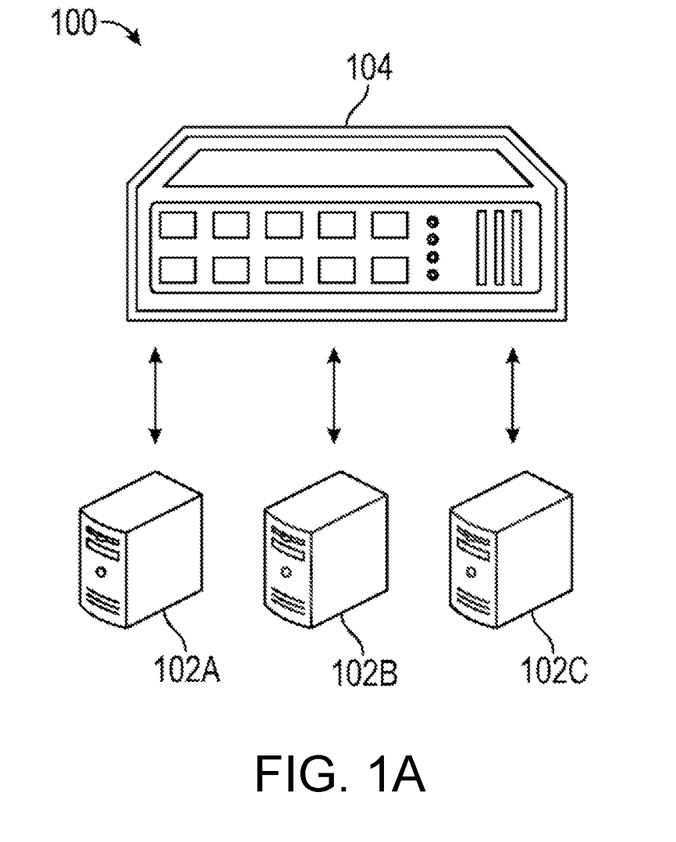
FIG. 1A depicts an example network environment in which power throttle for network switches may be implemented, according to various aspects of the subject technology.

FIG. 1A depicts an example network environment 100 in which power throttle for network switches may be implemented, according to various aspects of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes one or more electronic devices 102A-C connected via a network switch 104. The electronic devices 102A-C may be connected to the network switch 104, such that the electronic devices 102A-C may be able to communicate with each other via the network switch 104. The electronic devices 102A-C may be connected to the network switch 104 via wire (e.g., Ethernet cable) or wirelessly. The network switch 104, may be, and/or may include all or part of, the network switch discussed below with respect to the ingress packet processing 105 of FIG. 1B and/or the electronic system discussed below with respect to FIG. 5. The electronic devices 102A-C are presented as examples, and in other implementations, other devices may be substituted for one or more of the electronic devices 102A-C.

For example, the electronic devices 102A-C may be computing devices such as laptop computers, desktop computers, servers, peripheral devices (e.g., printers, digital cameras), mobile devices (e.g., mobile phone, tablet), stationary devices (e.g. set-top-boxes), or other appropriate devices capable of communication via a network. In FIG. 1A, by way of example, the electronic devices 102A-C are depicted as network servers. The electronic devices 102A-C may also be network devices, such as other network switches, and the like.

Figure 1B:
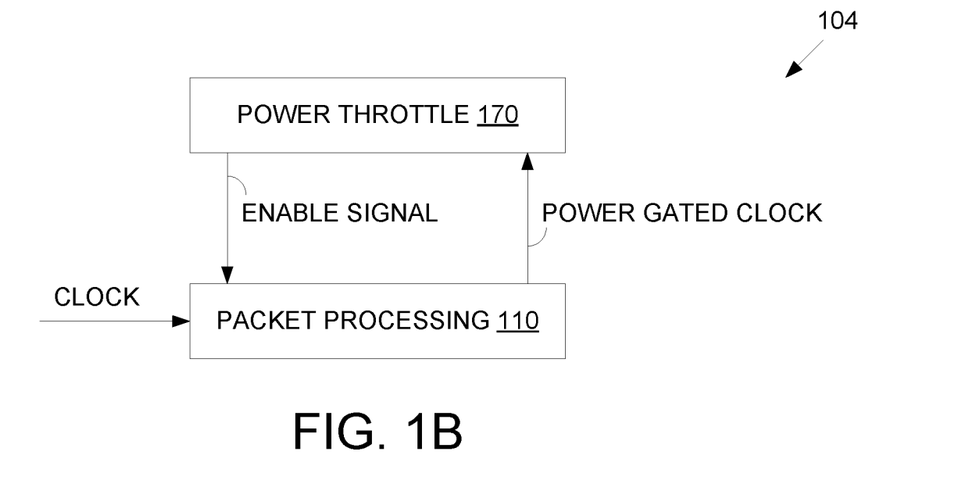
FIG. 1B depicts a logical block diagram of power throttle within an example network switch, according to various aspects of the subject technology.

The network switch 104 may implement power throttle as described herein. For example, FIG. 1B depicts a logical block diagram of power throttle 170 within an example network switch 104, according to various aspects of the subject technology. As shown in FIG. 1B, power throttle 170 asserts an enable signal which is sent to packet processing 110, which processes incoming ingress packets. For example, the enable signal may be asserted M times for every N edges of the clock signal, wherein power throttle 170 may adjust M upwards for higher performance or downwards for throttling. The value of N may be kept to a constant value according to required clock resolution, and the enable signal may be asserted to provide a smooth distribution over time. For example, if M is set to 128 and N is 256, then the enable signal (M) may be asserted with every other edge of the clock signal (N). The enable signal allows the clock signal to be power gated at packet processing 110 to reduce power consumption while maintaining performance. Further, the power gated clock is also provided back to power throttle 170 for power estimation purposes, which allows power throttle 170 to adjust and throttle the enable signal (M) in a feedback loop.

Figure 2A:
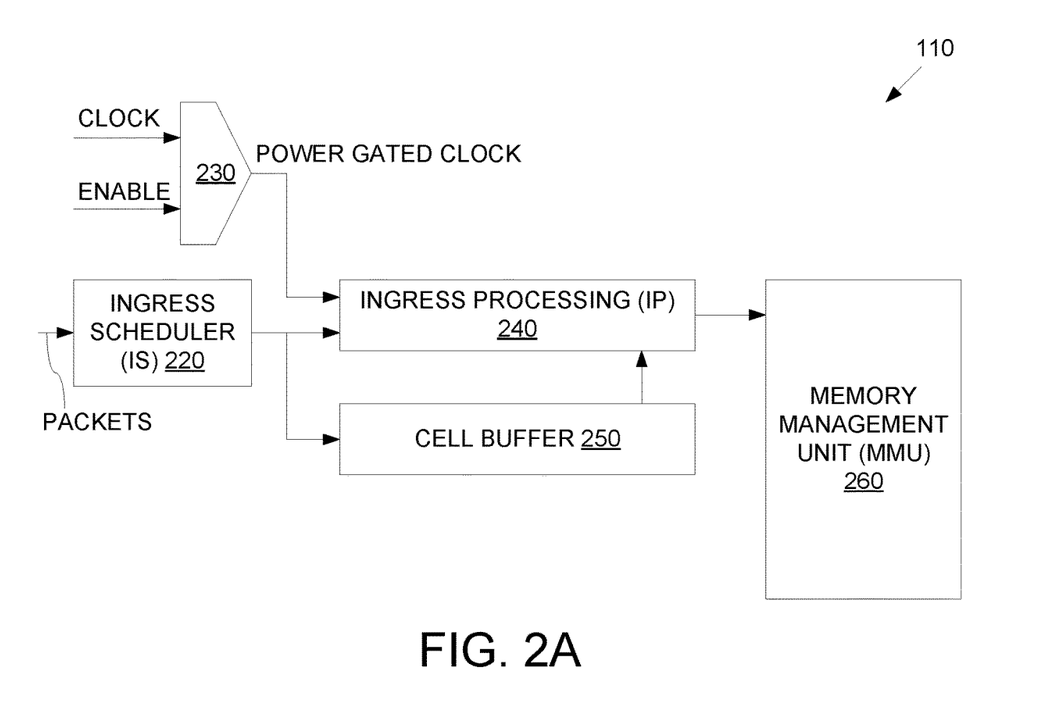
FIG. 2A depicts a logical block diagram of a packet processing block within an example network switch, according to various aspects of the subject technology.

FIG. 2A depicts a logical block diagram of a packet processing block 110 within an example network switch, according to various aspects of the subject technology. Power gating block 230 receives a clock signal and an enable signal to output a power gated clock, as described above in FIG. 1B. Since power gating block 230 may have a low leakage power, there is a potential for large power savings compared to a fixed down-clocking approach. Ingress scheduler (IS) 220 receives ingress packets, which are then scheduled for processing through ingress processing (IP) 240. For example, the ingress packets may correspond to network packets. Packets may be divided into fixed sized packet cells and queued into IP 240 and/or cell buffer 250. For example, if an ingress packet is 1000 bytes and the cells are 200 bytes, then the ingress packet may be divided into 5 cells. IP 240 may be configured to process up to a defined bandwidth of packet cells, such as 4 billion packets worth of cells per second, and cell buffer 250 may hold cells to be processed that exceed the available bandwidth of IP 240. After processing through IP 240, the ingress packets may proceed to memory management unit (MMU) 260 for further processing, for example by proceeding through an egress scheduler for outbound arbitration.

Figure 2B:
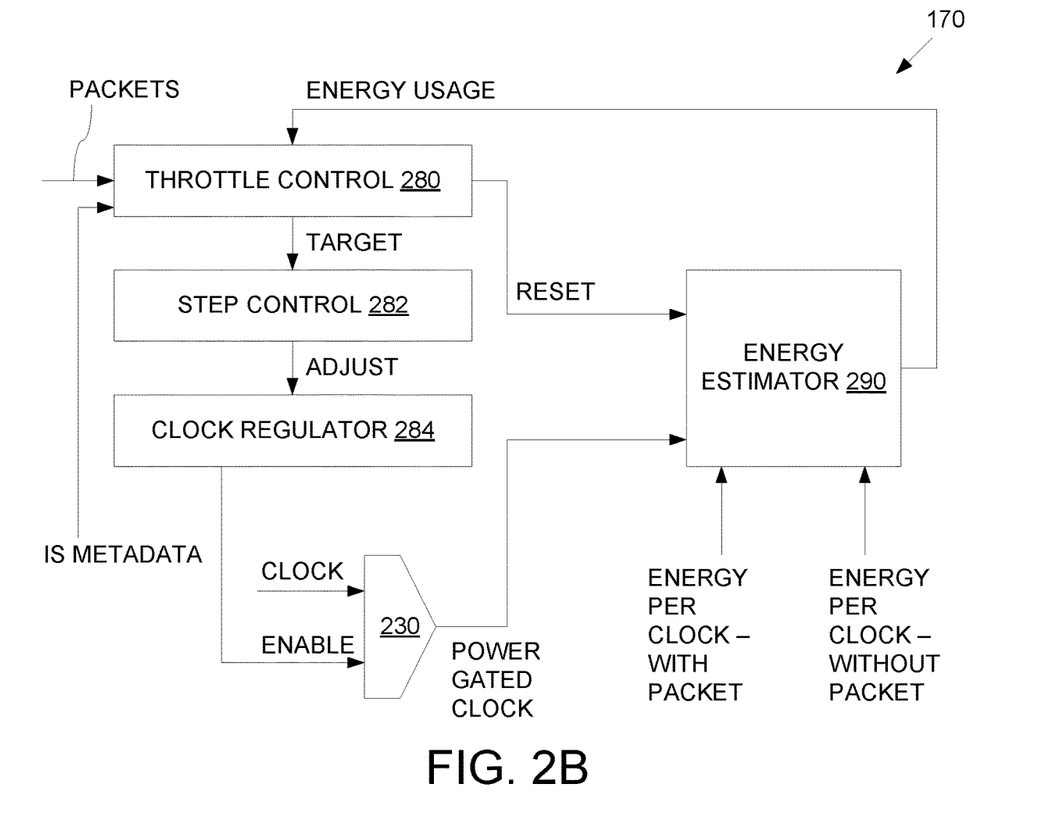
FIG. 2B depicts a logical block diagram of a power throttle block within an example network switch, according to various aspects of the subject technology.

FIG. 2B depicts a logical block diagram of a power throttle block, or power throttle 170, within an example network switch, according to various aspects of the subject technology. Throttle control 280 is able to count the number or rate of incoming ingress packets, and thus cells, for throttling. Further, throttle control 280 may receive ingress scheduler (IS) metadata, for example buffer fill rates. Based on an energy usage estimate from energy estimator 290, throttle control 280 can determine a target clock rate according to configurable throttle policies to meet a target average energy value, which may correspond to a target TDP that is configured for the example network switch. The target clock rate is provided to step control 282, which gradually adjusts the clock rate stepwise towards the target clock rate in adjustment periods after each measurement period. Step control 282 may send the adjustments to clock regulator 284, which in turn asserts the enable signal (M) at an adjusted rate for a defined number of clock edges (N) at power gating block 230. The resulting power gated clock is then fed back to energy estimator 290, which uses defined energy consumption estimates to calculate the estimated energy usage that is provided to throttle control 280. For example, the "energy per clock—with packet" may correspond to the estimated energy used when the ingress packets or cells are being processed (and thus enable is asserted), and the "energy per clock—without packet" may correspond to the estimated energy used when the ingress packets or cells are not being processed (and thus enable is not asserted). In some implementations, these values may be calibrated at manufacture time, and in other implementations, these values may be calibrated at run time by actual power consumption measurements, for example by measuring power consumption at various corners of the package die that implements IP 240.

As discussed above, throttle control 280 can determine a target clock rate to meet a target average energy value, which may correspond to a target TDP that is configured for the example network switch. This target average energy value may be averaged for a thermal average period, which may be calibrated to be a relatively long period, such as 100 milliseconds to 10 seconds. This may provide a buffer for burst traffic to be absorbed during each thermal average period to reduce throttling. When the thermal average period elapses, throttle control 280 may assert a reset signal to energy estimator 290, which in turn may perform a reset or initialization of surplus power budgets and other values according to configurable throttle policies for each thermal average period.

In some implementations, the power throttle 170 may be bypassed by manual override of the target clock rate. For example, a host or a controller may manually provide the target clock rate to step control 282, thereby overriding throttle control 280.

Figure 2C:
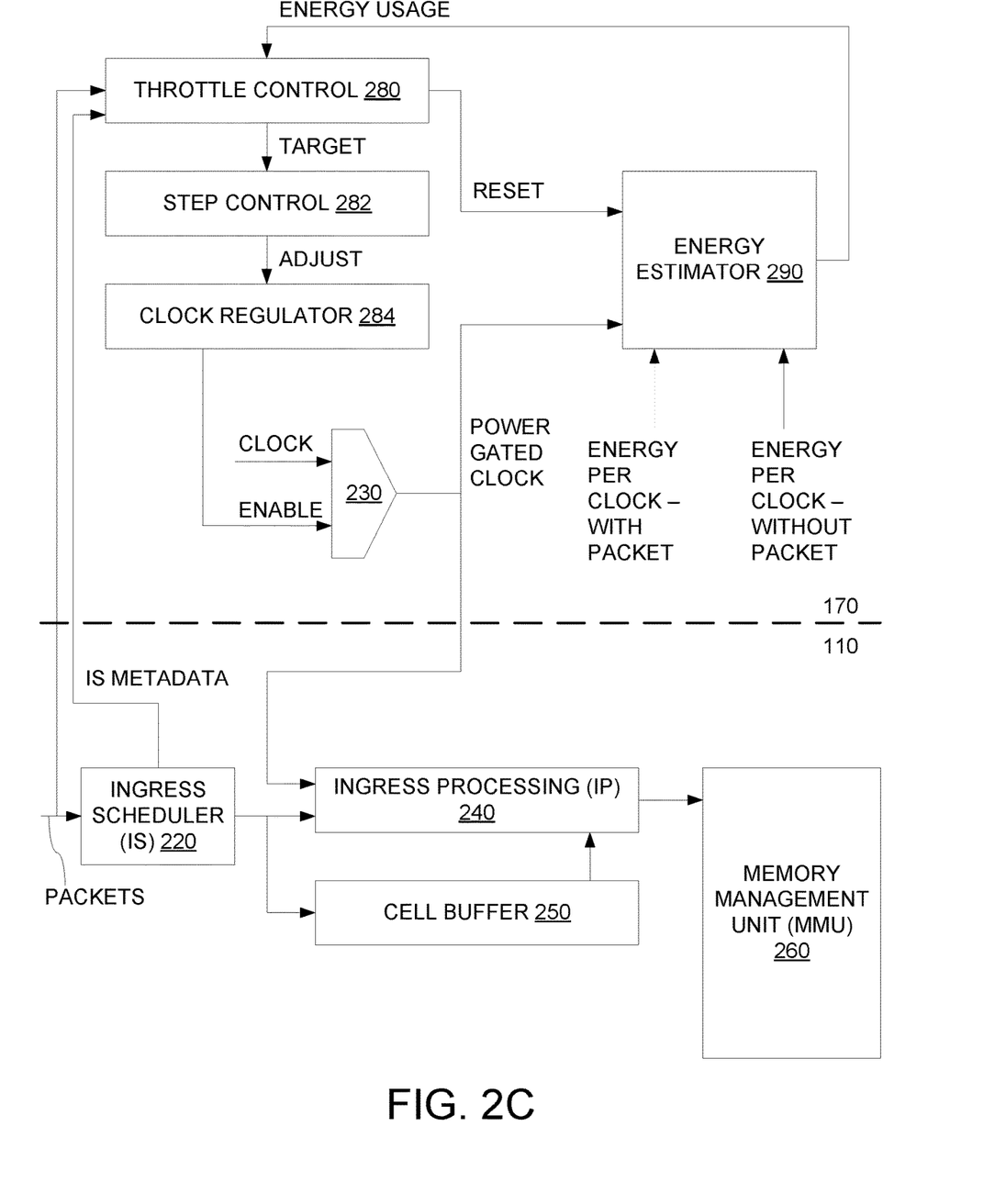
FIG. 2C depicts a logical block diagram of a power throttle block and a packet processing block within an example network switch, according to various aspects of the subject technology.

FIG. 2C depicts a logical block diagram of a power throttle block, or power throttle 170, and a packet processing block 110 within an example network switch, according to various aspects of the subject technology. As shown, FIG. 2C corresponds to a combination of FIG. 2A and FIG. 2B, which is also depicted in simplified form in FIG. 1B.

Figure 3A:
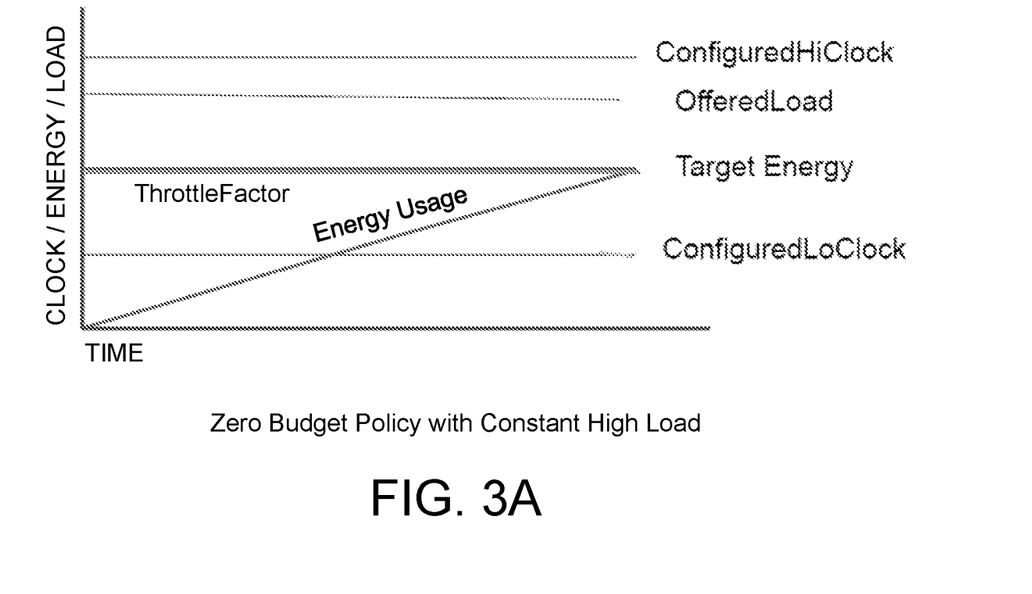
FIG. 3A depicts an example graph of power throttling when using a zero budget policy with a constant high load, according to various aspects of the subject technology.

FIG. 3A depicts an example graph of power throttling when using a zero budget policy with a constant high load, according to various aspects of the subject technology. The example graph may depict a single thermal average period. As shown, the power gated clock rate or "ThrottleFactor" may be adjustable within a defined range, or a ceiling correspond to "ConfiguredHiClock" and a floor corresponding to "ConfiguredLoClock". As discussed above, throttle control 280 may be configurable with various throttle policies, some which are described in FIGS. 3A-3D. In the example shown in FIG. 3A, the throttle policy corresponds to a "Zero Budget Policy". This means that when energy estimator 290 receives a reset signal from throttle control 280 to indicate the start of a new thermal average period, a surplus power budget is reset to zero. Throttle control 280 may be configured not to adjust the "ThrottleFactor", or target clock rate, beyond the clock rate needed to achieve the target TDP for the thermal average period, or the "Target Energy", when there is no credit available from the surplus power budget. Since the packet processing workload or "OfferedLoad" is a constant high load, there is no opportunity to fill the surplus power budget, and therefore the clock rate is kept constant without exceeding the "Target Energy" value.

Figure 3B:
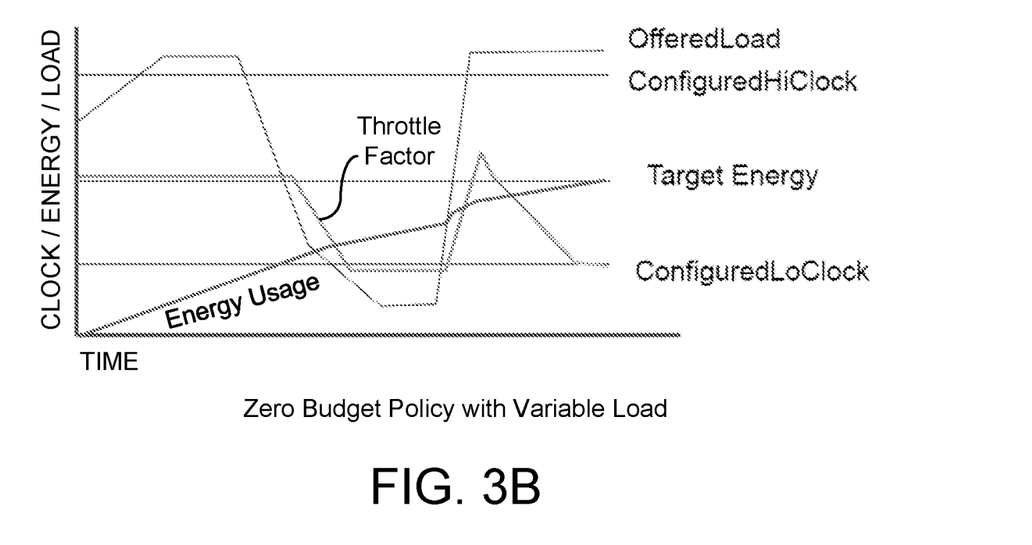
FIG. 3B depicts an example graph of power throttling when using a zero budget policy with a variable load, according to various aspects of the subject technology.

FIG. 3B depicts an example graph of power throttling when using a zero budget policy with a variable load, according to various aspects of the subject technology. As shown in FIG. 3B, the "OfferedLoad" now varies over time, which allows the surplus power budget to be credited when the target clock rate or "Throttle Factor" exceeds the actual adjusted power gated clock rate, which can be measured from the energy usage estimate received from energy estimator 290. For example, as discussed above, the step control 282 may gradually adjust the clock rate towards the target clock rate, in which case the power gated clock rate may be less than it could be at that time. The difference between the measured and target clock rate is therefore credited to the surplus power budget. When a spike in the "OfferedLoad" workload is later encountered, the surplus power budget may be expended to raise the "Throttle Factor", as indicated by the upwards triangle portion of the "Throttle Factor". After the surplus power budget is expended, throttling may resume to meet the target energy average for the thermal average period, as indicated by the downwards triangle portion of the "Throttle Factor". Note that the "Throttle Factor" is bounded by the "ConfiguredLoClock" floor and does not throttle any further. Thus, the conservative zero budget policy helps to conserve power budget to address future high workloads.

Figure 3C:
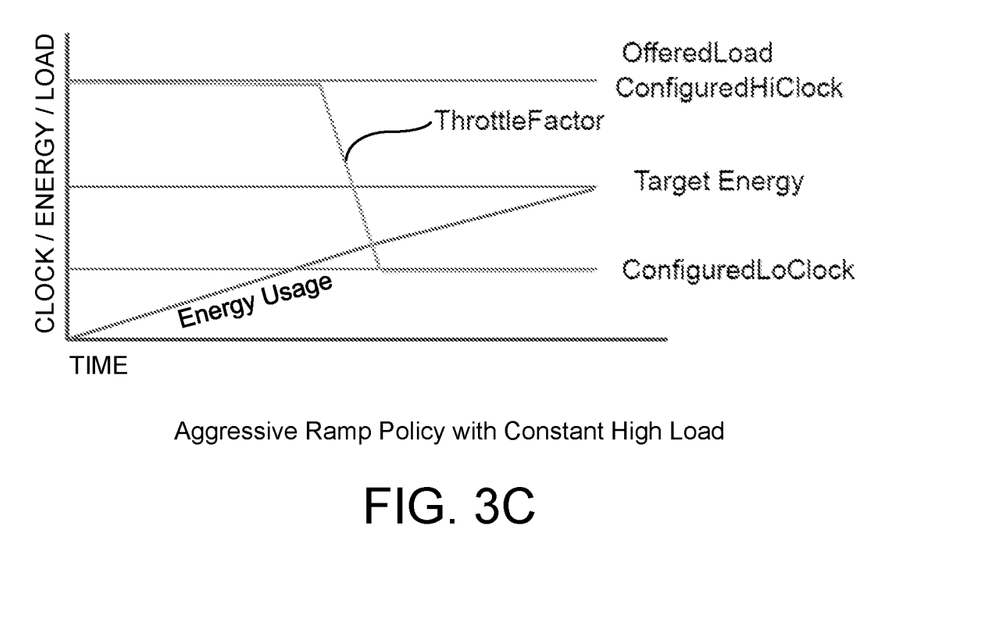
FIG. 3C depicts an example graph of power throttling when using an aggressive ramping policy with a constant high load, according to various aspects of the subject technology.

FIG. 3C depicts an example graph of power throttling when using an aggressive ramping policy with a constant high load, according to various aspects of the subject technology. When the throttle policy is set to "Aggressive Ramp Policy", energy estimator 290 may set the surplus power budget to an initial non-zero value when a reset signal is received from throttle control 280 to indicate the start of a new thermal average period. Thus, as shown in FIG. 3C, the "Throttle Factor" may be immediately set to the ceiling, or "ConfiguredHiClock", and remain there until the surplus power budget is exhausted, at which point throttling is incurred and the "Throttle Factor" ramps down to "ConfiguredLoClock" for the remainder of the thermal average period.

Figure 3D:
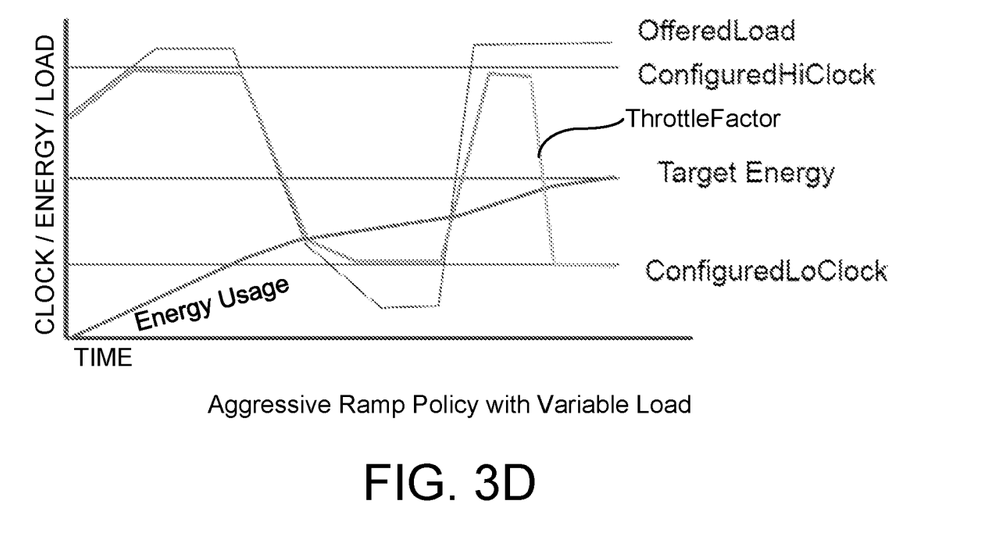
FIG. 3D depicts an example graph of power throttling when using an aggressive ramping policy with a variable load, according to various aspects of the subject technology.

FIG. 3D depicts an example graph of power throttling when using an aggressive ramping policy with a variable load, according to various aspects of the subject technology. As shown in FIG. 3D, since the aggressive ramping policy prioritizes the immediate usage of any surplus power budget, the budget may be quickly exhausted and the "ThrottleFactor" may be forced to throttle towards the end of the thermal average period, as shown. Thus, the aggressive ramping policy prioritizes burst performance but may quickly exhaust power budget for future workloads. Whether conservative or aggressive ramping is preferred may depend on application latency and jitter requirements.

Another policy may correspond to a buffer fill rate policy. For example, if the buffer fill rate of cell buffer 250 exceeds a upwards threshold, as indicated by the IS metadata, then the "ThrottleFactor" may be set to the maximum possible, or "ConfiguredHiClock". Similarly, if the buffer fill rate of cell buffer 250 falls below a downwards threshold, then the "ThrottleFactor" may be set to the minimum possible, or "ConfiguredLoClock". In some implementations, multiple threshold levels may be provided so that clock rate targets can be chosen that are distributed between the "ConfiguredHiClock" and "ConfiguredLoClock". This buffer fill rate policy allows the power gated clock rate to quickly ramp according to incoming workload.

Figure 4:
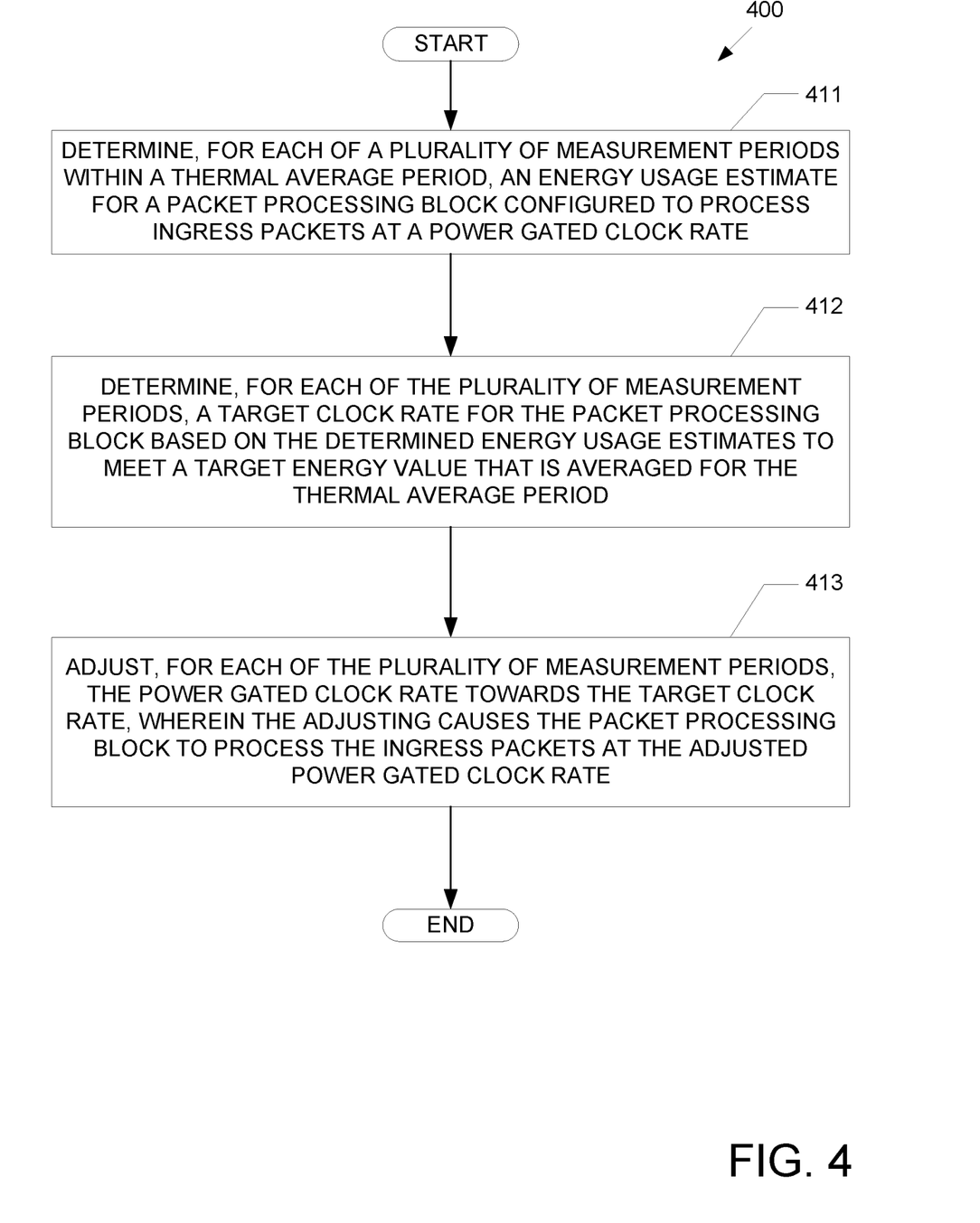
FIG. 4 depicts an example process for providing power throttle for network switches, according to various aspects of the subject technology.

FIG. 4 depicts an example process 400 for providing power throttle for network switches, according to various aspects of the subject technology. For explanatory purposes, the various blocks of example process 400 are described herein with reference to FIGS. 1A-3D, and the components and/or processes described herein. The one or more of the blocks of process 400 may be implemented, for example, by a computing device, including a processor and other components utilized by the device. In some implementations, one or more of the blocks may be implemented apart from other blocks, and by one or more different processors or devices. Further for explanatory purposes, the blocks of example process 400 are described as occurring in serial, or linearly. However, multiple blocks of example process 400 may occur in parallel. In addition, the blocks of example process 400 need not be performed in the order shown and/or one or more of the blocks of example process 400 need not be performed.

In the depicted example flow diagram, for each of a plurality of measurement periods within a thermal average period, an energy usage estimate is determined for a packet processing block configured to process ingress packets at a power gated clock rate (411). Referring to FIG. 2C, this may correspond to energy estimator 290 determining an energy usage estimate for a plurality of measurement periods within a thermal average period, wherein the energy usage estimate is for IP 240 operating at a power gated clock rate provided by power gating block 230. The measurement periods may each correspond to, for example, approximately 1 to 10 percent of the thermal average period. The measurement periods may be substantially equal time periods.

Process 400 may continue with determining, for each of the plurality of measurement periods, a target clock rate for the packet processing block based on the determined energy usage estimates to meet a target energy value that is averaged for the thermal average period (412). Referring to FIG. 2C, this may correspond to throttle control 280 determining, for each of the plurality of measurement periods, a target clock rate for IP 240 based on the energy usage estimates from 411 to meet a target TDP that is averaged for the thermal average period. For example, referring to FIG. 3A-3D, the target TDP that is averaged for the thermal average period may correspond to the depicted "Target Energy" line, wherein FIG. 3A-3D each depict a single thermal average period.

Process 400 may continue with adjusting, for each of the plurality of measurement periods, the power gated clock rate towards the target clock rate, wherein the adjusting causes the packet processing block to process the ingress packets at the adjusted power gated clock rate (413). Referring to FIG. 2C, this may correspond to step control 282 adjusting, for each of the plurality of measurement periods, the power gated clock rate towards the target clock rate from 412. In some implementations, this may be done stepwise within a plurality of adjustment periods after each measurement period. An adjustment period may correspond to a time length that is 1 to 10 percent of a measurement period. The plurality of adjustment periods may correspond to a combined time length of a single measurement period. As discussed above, the clock regulator 284 may implement the power gated clock rate by asserting M enable signals out of every N clock edges. As shown in FIG. 2C, this causes the power gated clock to be output to the input of IP 240, which in turn causes IP 240 to process the ingress packets at the adjusted power gated clock rate. The steps of process 400 may be repeated for successive thermal average periods.

Many aspects of the above-described example process 400, and related features and applications, may also be implemented as software processes that are specified as a set of instructions recorded on a computer readable storage medium (also referred to as computer readable medium), and may be executed automatically (e.g., without user intervention). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

The term "software" is meant to include, where appropriate, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
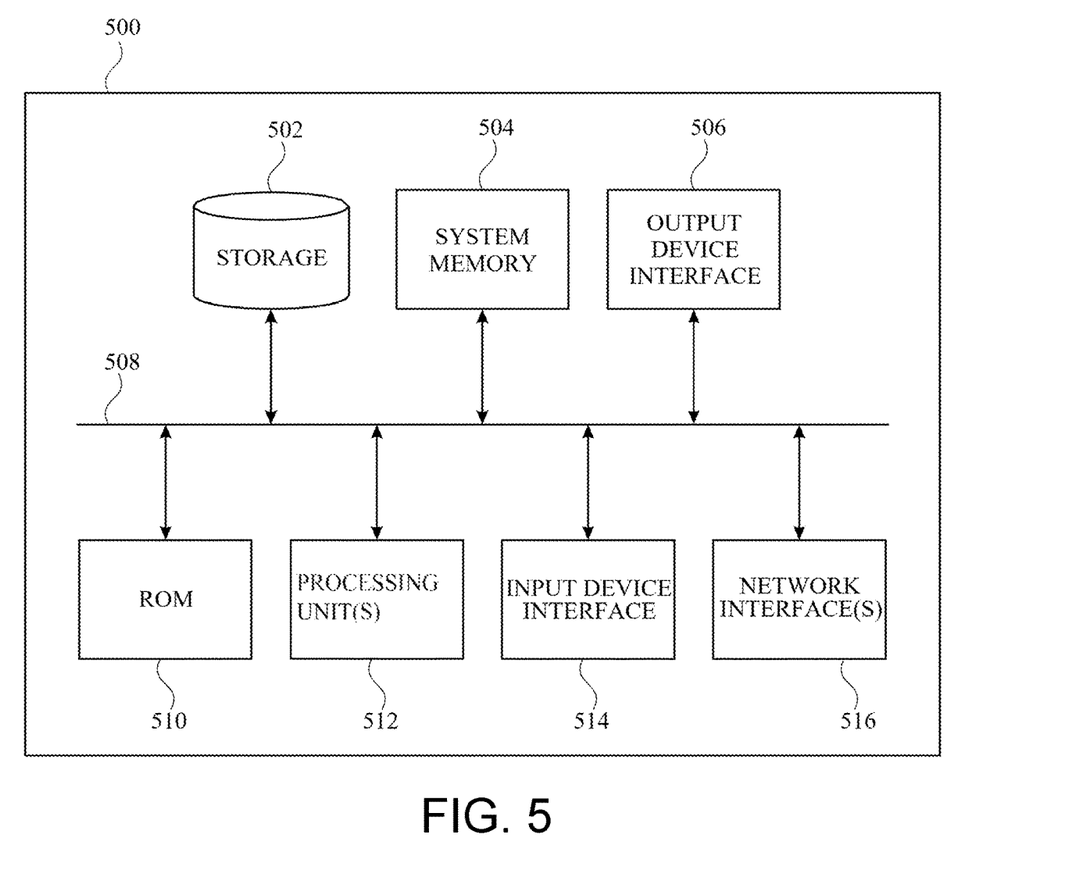
FIG. 5 illustrates an electronic system with which one or more implementations of the subject technology may be implemented.

FIG. 5 illustrates an electronic system 500 with which one or more implementations of the subject technology may be implemented. The electronic system 500 can be, and/or can be a part of, the network switch 104 shown in FIG. 1B. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes, through the one or more network interface(s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation.

Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   determining, for a time period, an energy usage estimate for packet processing circuitry configured to process one or more packets at a clock rate;
   determining, for the time period, a target clock rate for the packet processing circuitry based at least in part on the determined energy usage estimate and a target energy value corresponding to the time period; and
   adjusting, for the time period, the clock rate based at least in part on the target clock rate, wherein the adjusting causes the packet processing circuitry to process the one or more packets at the adjusted clock rate.

2. The method of claim 1, wherein the target clock rate is determined based on a surplus power budget that is credited while the target clock rate exceeds the adjusted clock rate.

3. The method of claim 2, wherein the time period is within a thermal average period and the surplus power budget is reset to zero at a start of the thermal average period.

4. The method of claim 2, wherein the time period is within a thermal average period and the surplus power budget is set to an initial budget value at a start of the thermal average period.

5. The method of claim 1, wherein the target clock rate is determined based on whether a buffer fill rate for the one or more packets exceeds a threshold fill rate.

6. The method of claim 1, wherein the energy usage estimate corresponds to the packet processing circuitry processing a determined number of packet cells from the one or more packets.

7. The method of claim 1, wherein the time period is one of a plurality of time periods within a thermal average period and each of the plurality of time periods comprises a substantially equal time period.

8. The method of claim 7, wherein the adjusting comprises stepwise adjustments of the clock rate using a plurality of adjustment periods after each of the plurality of time periods.

9. The method of claim 8, wherein the plurality of adjustment periods in aggregate comprises a combined time period substantially equal to one of the plurality of time periods.

10. The method of claim 8, wherein each of the plurality of adjustment periods is a time period that is approximately 1 to 10 percent of one of the plurality of time periods.

11. The method of claim 1, wherein the time period is withing a thermal average period that is approximately 100 milliseconds to 10 seconds.

12. The method of claim 1, wherein the time period is one of a plurality of time periods within a thermal average period and each of the plurality of time periods is approximately 1 to 10 percent of the thermal average period.

13. The method of claim 1, wherein the target clock rate is bounded by a predetermined range.

14. A system comprising:
    packet processing circuitry configured to process one or more ingress packets at a clock rate; and
    processing circuitry configured to:
       determine, for a time period within a thermal average period, an energy usage estimate for the packet processing circuitry;
       determine, for the time period, a target clock rate for the packet processing circuitry based at least in part on the determined energy usage estimate to meet a target energy value that is averaged for the thermal average period; and
       adjust, for the time period, the clock rate based at least in part on the target clock rate, wherein the adjust causes the packet processing circuitry to process the one or more ingress packets at the adjusted clock rate.

15. The system of claim 14, wherein the processing circuitry is further configured to determine the target clock rate based on a surplus power budget that is credited while the target clock rate exceeds the adjusted clock rate, and wherein the surplus power budget is set to one of zero or an initial budget value at a start of the thermal average period.

16. The system of claim 14, wherein the processing circuitry is further configured to determine the target clock rate based on whether a buffer fill rate for the one or more ingress packets exceeds a threshold fill rate.

17. The system of claim 14, wherein the time period is one of a plurality of time periods within the thermal average period and the processing circuitry is further configured to adjust the clock rate using a plurality of adjustment periods after each of the plurality of time periods.

18. The system of claim 14, wherein the time period is within a thermal average period that is approximately 100 milliseconds to 10 seconds.

19. The system of claim 14, wherein the target clock rate is bounded by a predetermined range.

20. A non-transitory storage medium comprising instructions that, when executed by one or more processors, cause the processors to perform operations comprising:
  determining, for each of a plurality of measurement periods within a thermal average period, an energy usage estimate for packet processing circuitry configured to process ingress packets at a clock rate; and
  adjusting, for each of the plurality of measurement periods, the clock rate based at least in part on the determined energy usage estimates and a target energy value that is averaged for the thermal average period, wherein the adjusting causes the packet processing circuitry to process the ingress packets at the adjusted clock rate.

* * * * *